United States Patent
Urabe et al.

(10) Patent No.: US 6,740,275 B2
(45) Date of Patent: May 25, 2004

(54) FLAME-RETARDANT POLYAMIDE-BASED PROTECTIVE SHEET

(75) Inventors: Hiroshi Urabe, Hiratsuka (JP); Seiji Morimoto, Hiratsuka (JP); Morio Tsunoda, Hiratsuka (JP); Michio Nakata, Hiratsuka (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 0 days.

(21) Appl. No.: 09/946,041

(22) Filed: Sep. 4, 2001

(65) Prior Publication Data

US 2002/0106523 A1 Aug. 8, 2002

(30) Foreign Application Priority Data

| Sep. 4, 2000 | (JP) | 2000-267618 |
| Oct. 25, 2000 | (JP) | 2000-326152 |
| Apr. 12, 2001 | (JP) | 2001-113726 |

(51) Int. Cl.[7] ............................................. B29C 47/00
(52) U.S. Cl. .................... 264/176.1; 428/220; 524/100; 524/538
(58) Field of Search ....................... 428/220; 264/176.1; 524/100, 538

(56) References Cited

U.S. PATENT DOCUMENTS 6,184,282 B1 * 2/2001 Gareiss et al. ............... 524/493

FOREIGN PATENT DOCUMENTS

JP          05-320504         12/1993

* cited by examiner

*Primary Examiner*—Ana Woodward
(74) *Attorney, Agent, or Firm*—Edwards & Angell, LLP; David G. Conlin; Lisa Swiszcz Hazzard

(57) ABSTRACT

The present invention relates to a flame-retardant polyamide-based protective sheet comprising a polyamide resin composition comprising 98 to 70 parts by weight of a polyamide resin and 2 to 30 parts by weight of a triazine-based flame retardant, and produced by extrusion-molding said polyamide resin composition.

8 Claims, No Drawings

FLAME-RETARDANT POLYAMIDE-BASED PROTECTIVE SHEET

BACKGROUND OF THE INVENTION

The present invention relates to a flame-retardant polyamide-based protective sheet, and more particularly, to a protective sheet containing a halogen-free flame retardant which is excellent in flame retardancy, incineration property, environmental suitability, flexibility, tear property, heat resistance, heat-aging resistance, mechanical strength, workability and industrial productivity.

Conventional protective sheets have been usually produced from polyolefins such as EVA. It has now been required to impart a good flame retardancy to these protective sheets for the purpose of improving a safeness thereof when used for covering buildings such as domiciles, warehouses, tents and electric power plants, automobiles, or the like. Hitherto, vinyl chloride sheets have been extensively used as flame-retardant protective sheets because of excellent flame retardancy and tenacity thereof. However, in recent years, there is such a social demand that the use of halogen-based compounds which tend to cause environmental pollution and damage to human health, should be avoided. From this viewpoint, the vinyl chloride sheets are unsuitable as protective sheets.

On the other hand, since polyolefins themselves are poor in flame retardancy, it is difficult to impart a flame retardancy thereto without incorporating halogens thereinto. Even If the polyolefins successfully show a flame retardancy without using halogens, polyolefin-based sheets still tend to suffer from electrostatic firing or shock due to easy electrification thereof unless they are subjected specific antistatic treatments, and have problems such as poor workability due to high specific gravity thereof, and very poor mechanical strength and productivity. In addition, the polyolefin-based sheets containing metals, etc. have further problems such as generation of corrosive or harmful gases as well as poor workability, low safety and deteriorated maintenance of incineration facilities due to residual ashes upon incineration thereof.

Thus, conventional protective sheets have failed to show excellent flame retardancy, incineration property, environmental suitability, flexibility, tear property, heat resistance, heat-aging resistance, mechanical strength, workability and industrial productivity.

SUMMARY OF THE INVENTION

An object of the present invention is to provide a protective sheet which is excellent in flame retardancy, incineration property, environmental suitability, flexibility, tear property, heat resistance, heat-aging resistance, mechanical strength, workability and industrial productivity.

To attain the above aim, in the first aspect of the present invention, there is provided a flame-retardant polyamide-based protective sheet comprising a polyamide resin composition comprising 98 to 70 parts by weight of a polyamide resin and 2 to 30 parts by weight of a triazine-based flame retardant, and produced by extrusion-molding said polyamide resin composition.

In a second aspect of the present invention, there is provided an extrusion-molded flame-retardant polyamide-based protective sheet which comprises:

a layer A comprising a polyamide resin composition comprising 98 to 70 parts by weight of a polyamide resin and 2 to 30 parts by weight of a triazine-based flame retardant, and a layer B which comprises at least one thermoplastic resin and is laminated on at least one surface of said layer A;

the ratio of a thickness of said layer B to a thickness of said layer A being less than 0.8.

In a third aspect of the present invention, there is provided an extrusion-molded laminated sheet which comprises:

a layer A comprising a polyamide resin composition comprising 98 to 70 parts by weight of a polyamide resin and 2 to 30 parts by weight of a triazine-based flame retardant; and a layer B which comprises at least one thermoplastic resin and is laminated on at least one surface of said layer A;

the ratio of a thickness of said layer B to a thickness of said layer A being less than 0.8.

In a fourth aspect of the present invention, there is provided a flame-retardant polyamide-based protective sheet which comprises a polyamide resin composition comprising 99 to 40 parts by weight of a polyamide resin, 1 to 40 parts by weight of a triazine-based flame retardant, and 0.1 to 20 parts by weight of an ester compound obtained by esterifying p-hydroxybenzoic acid, o-hydroxybenzoic acid or mixture thereof, with a branched aliphatic alcohol having 12 to 22 carbon atoms; and which is produced by extrusion-molding said polyamide resin composition.

In a fifth aspect of the present invention, there is provided a polyamide resin composition comprising 99 to 40 parts by weight of a polyamide resin, 1 to 40 parts by weight of a triazine-based flame retardant, and 0.1 to 20 parts by weight of an ester compound obtained by esterifying p-hydroxybenzoic acid, o-hydroxybenzoic acid or mixture thereof, with a branched aliphatic alcohol having 12 to 22 carbon atoms.

In a sixth aspect of the present invention, there is provided an extrusion-molded flame-retardant polyamide-based protective sheet comprising:

a layer A comprising a polyamide resin composition comprising 99 to 40 parts by weight of a polyamide resin, 1 to 40 parts by weight of a triazine-based flame retardant, and 0.1 to 20 parts by weight of an ester compound obtained by esterifying p-hydroxybenzoic acid and/or o-hydroxybenzoic acid, with a branched aliphatic alcohol having 12 to 22 carbon atoms; and a layer B laminated on at least one surface of said layer A, said layer B comprising at least one thermoplastic resin, the ratio of a thickness of said layer B to a thickness of said layer A being less than 0.8.

In a seventh aspect of the present invention, there is provided an extrusion-molded laminated sheet comprising:

a layer A made of a polyamide resin composition comprising 99 to 40 parts by weight of a polyamide resin, 1 to 40 parts by weight of a triazine-based flame retardant, and 0.1 to 20 parts by weight of an ester compound obtained by esterifying p-hydroxybenzoic acid, o-hydroxybenzoic acid or mixture thereof, with a branched aliphatic alcohol having 12 to 22 carbon atoms; and a layer B which comprises at least one thermoplastic resin and is laminated on at least one surface of said layer A, the ratio of a thickness of said layer B to a thickness of said layer A being less than 0.8.

In a eighth aspect of the present invention, there is provided an extrusion-molded product produced by extrusion-molding the polyamide resin composition according to the above fifth aspect of the present invention.

In a ninth aspect of the present invention, there is provided a tube produced by extrusion-molding the polyamide resin according to the above fifth aspect of the present invention.

DETAILED DESCRIPTION OF THE INVENTION

The present invention will be described in detail below. Meanwhile, in general definitions, "sheets" mean those having a thickness of not less than 0.254 mm (¹/₁₀₀ inch), and "films" mean those having a thickness of less than 0.254 mm. However, the sheets described herein should be construed to involve both the "sheets" and "films".

The "protective sheet" of the present invention means those sheets used for protecting working portions upon building construction or painting. For example, the protective sheet is used to shield working sites and peripheral portions thereof in plaster works or painting works as well as finished paint surface, and avoid possible danger in construction work field.

In practical applications, the protective sheet (curing sheet) may be used, for example, (1) to enclose or surround building construction sites, construction work fields or floors for preventing dirt or dusts from being scattered outside or for eliminating the occurrence of possible dangers; (2) to enclose or surround ware houses, tents or insides thereof as well as floors for preventing rainwater from entering thereinto or for preventing these places from being contaminated; (3) to enclose or surround local working sites within electric power plants or other buildings for preventing peripheral portions thereof from being contaminated or for preventing the occurrence of fire accidents due to sparks from electric equipment; (4) enclose or surround automobiles, etc. upon painting works thereof for preventing peripheral portions from being contaminated with paint or for preventing still wet painted surfaces of automobiles, etc., from being stained with dirt or dusts before completely dried; or the like.

First, the flame-retardant polyamide-based protective sheet according to the first aspect of the present invention is explained.

Polyamide

As the polyamide resins used in the present invention, there may be exemplified those polyamides obtained by polycondensing 3 or more-membered lactams or polymerizable ω-amino acids, or by polycondensing a dibasic acid with diamine. Examples of the polyamide resins may include polymers of ε-caprolactam, aminocaproic acid, enantholactam, 7-aminoheptanoic acid, 11-aminoundecanoic acid, 9-aminononanoic acid, α-pyrrolidone, α-piperidone or the like; polymers produced by polycondensing a diamine such as hexamethylenediamine, nonamethylenediamine, undecamethylenediamine, dodecamethylenediamine and m-xylylenediamine, with a dicarboxylic acid such as terephthalic acid, isophthalic acid, adipic acid, sebacic acid, dodecanedioic acid and glutaric acid; or copolymers thereof. Specific examples of the polyamide resins may include nylons 4, 6, 7, 8, 11, 12, 6.6, 6.9, 6.10, 6.11, 6.12, 6T, 6/6.6, 6/12, 6/6T, 6T/6I, MXD6 or the like. These polyamide resins may be used alone or in combination of any two or more thereof.

The polyamide resins used in the present invention may be terminal-sealed with carboxylic acids or amines. In particular, polyamide resins terminal-sealed with carboxylic acids or amines having 6 to 22 carbon atoms are preferred. Specific examples of the carboxylic acids used for the terminal-sealing may include aliphatic monocarboxylic acids such as caproic acid, caprylic acid, capric acid, lauric acid, myristic acid, palmitic acid, stearic acid, behenic acid and the like. Specific examples of the amines used for the terminal-sealing may include aliphatic primary amines such as hexylamine, octylamine, decylamine, laurylamine, myristylamine, palmitylamine, stearylamine, behenylamine and the like. The amount of the carboxylic acid or amine used for the terminal-sealing is about 30 μeq/g. The polyamide resins preferably used in the present invention may have a specific polymerization degree, i.e., a specific relative viscosity. Specifically, the relative viscosity of the polyamide resins is preferably in the range of 2.0 to 6.5, more preferably 2.8 to 5.5, especially preferably 3.0 to 5.0 as measured at 25° C. at a polyamide concentration of 1% in 98% sulfuric acid according to JIS K-6810. When the relative viscosity of the polyamide resin is less than 2.0, it become difficult to mold the polyamide resin because of too small melt-viscosity thereof, resulting in poor mechanical strength of the obtained molded product. When the relative viscosity of the polyamide resin is more than 6.5, the resin is deteriorated in melt-fluidity.

Among these polyamide resins, nylon 6, copolymerized nylons 6/66 and/or nylon 66 are preferred from the standpoints of flame retardancy, mechanical strength and moldability.

Triazine-based Flame Retardant

As the triazine-based flame retardant, there may be exemplified compounds represented by the following formulae (1) and (2):

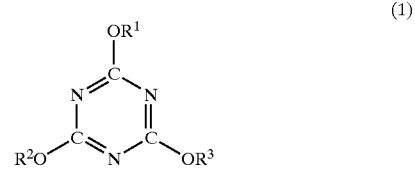

(1)

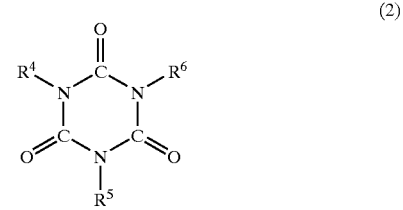

(2)

wherein $R^1$ to $R^6$ are independently hydrogen or alkyl, melamines, melamine cyanurates or the like.

Specific examples of the compounds represented by the formula (1) may include cyanuric acid, trimethyl cyanurate, triethyl cyanurate, tri(n-propyl)cyanurate, methyl cyanurate, diethyl cyanurate or the like.

Specific examples of the compounds represented by the formula (2) may include isocyanuric acid, trimethyl isocyanurate, triethyl isocyanurate, tri(n-propyl) isocyanurate, diethyl isocyanurate, methyl isocyanurate or the like.

As the melamines, there may be exemplified melamine, melamine derivatives, compounds having a similar structure to that of melamine, condensation products of melamine or the like. Specific examples of the melamines may include melamine, ammelid, ammelin, formoguanamine, guanylmelamine, cyanomelamine, arylmelamine, melam, melem, melon or the like.

As the melamine cyanurate, there may be exemplified reaction products obtained by reacting cyanuric acid with melamine at an equimolar ratio. Some of amino groups or hydroxy groups contained in the melamine cyanurate may be substituted with any other groups. The melamine cyanurate may be produced, for example, by mixing an aqueous cyanuric acid solution with an aqueous melamine solution, reacting these compounds with each other at a temperature of 90 to 100° C. while stirring, and then filtering the reaction solution to remove the resultant precipitate therefrom. The thus obtained melamine cyanurate is in the form of white solids, and is preferably pulverized into a fine powder upon use. As a matter of course, commercial products of melamine cyanurate may be used either immediately or after being pulverized into powder.

Among these triazine-based flame retardants, cyanuric acid, isocyanuric acid, melamine, melamine cyanurate and the like are preferred, and melamine cyanurate is more preferred because this compound is free from inconveniences such as blooming, i.e., such a phenomenon that decomposed products are bled out onto the surface of a molded product.

Polyamide Resin Composition

The polyamide resin composition of the present invention comprises 98 to 70 parts by weight of the polyamide resin and 2 to 30 parts by weight of the triazine-based flame retardant. When the amount of triazine-based flame retardant blended is less than 2 parts by weight, the obtained composition tends to be deteriorated in flame retardancy. When the amount of triazine-based flame retardant blended is more than 30 parts by weight, the obtained composition tends to be deteriorated in incineration property and workability. The amount of the triazine-based flame retardant blended is preferably 3 to 20 parts by weight based on 100 parts by weight of the polyamide resin composition from the standpoint of well-balanced relation between flame retardancy, incineration property and workability.

Protective Sheet According to the First Aspect of the Present Invention

The polyamide resin composition of the present invention usually has a specific gravity of not more than 1.25 in order to facilitate the transportation of protective sheets produced therefrom and the works for covering floors, apparatuses or buildings. In general, a protective sheet having a length of about 100 m and a width of about 1 m is wound into a roll for transporting and working conveniences. If the specific gravity of the protective sheet is more than 1.25, the weight of the rolled protective sheet becomes 20 kg or more, resulting in deteriorated workability. In the consideration of a good workability, the specific gravity of the polyamide resin composition is preferably 1.10 to 1.25, more preferably 1.11 to 1.22.

The flame-retardant laminated sheet or the flame retardant single-layer sheet of the present invention can be satisfactorily used as a protective sheet which is required to have a good incineration property and tear property. The used protective sheets which are soiled with dirt, are usually disposed as wastes. The bulky protective sheets are not suitable for land-filling and, therefore, preferably incinerated. For this reason, the protective sheet is required to generate a less amount of ashes upon incineration from the standpoints of environmental protection and facilitated works in incinerators. Therefore, the amount of residual ashes remaining after burning the polyamide resin composition of the present invention at 700° C. for 5 hours, is usually not more than 2% by weight. When the amount of the residual ashes is more than 2% by weight, complicated cleaning works of the incinerator are required, resulting in deteriorated workability. Also, in some specific applications such as atomic power plant-related facilities, the temperature of the incinerator cannot be raised up to near 800° C. At such a low temperature, various elements contained in the residual ashes such as P, F, Cl, Br, Pb and Zn cannot be completely burned. In these specific applications, the amount of the residual ashes is limited to not more than 0.1% by weight. When the amount of the residual ashes is more than 0.1% by weight, the residual ashes are firmly stuck to walls of the incinerator, resulting in not only deteriorated workability but also severe damage to the incineration facilities. For example, upon incineration of 10 tons of wastes, if the amount of the residual ashes is not more than 0.1% by weight, the total weight of the incineration residues is only as small as about 10 kg or less. Such a small amount of the incineration residues can be readily treated or removed by manual operations. Whereas, if the amount of the residual ashes is 1% by weight, metallic masses, etc., are produced in an amount as large as about 100 kg, so that it becomes difficult to treat or remove such a large amount of the incineration residues.

In case where the protective sheet according to the present invention is used in atomic power plants and the like specific facilities, the occurrence of fire might induce more significant accidents. Therefore, when used in these facilities, the protective sheet of the present invention is required to exhibit a high flame retardancy. Specifically, the protective sheet of the present invention preferably has an oxygen index of not less than 26 as measured by the method described in JIS K-7201, and is more preferably a "VTM-0"-accepted product when tested by UL-94 VTM method. Thus, the protective sheet of the present invention has an oxygen index of not less than 26 and an excellent flame retardancy and, therefore, can be preferably used as a fireproofing protective sheet, especially can be satisfactorily used as those for atomic power plants.

The protective sheet of the present invention preferably has a tear strength of not less than 20 N/mm as measured by the method described in JIS K-7128. When the tear strength of the protective sheet is less than 20 N/mm, the protective sheet tends to be readily broken upon contact with edges of apparatuses. The tear strength of the protective sheet is more preferably not less than 30 N/mm.

The polyamide resin composition may be blended and kneaded with pigments, dyes, fillers, nucleating agents, mold release agents, stabilizers, antistatic agents or other known additives unless the addition thereof adversely affects the effects of the present invention, upon the production of the protective sheet. In addition, the polyamide resin composition may also be blended with thermoplastic resins other than polyamide resins, for example, polyolefins such as EVA unless the addition thereof adversely affects the effects of the present invention.

The protective sheet of the present invention can be produced by extrusion-molding the polyamide resin composition. More specifically, the protective sheet may be produced by a T-die method in which the molten polyamide resin composition is continuously extruded through a T-die, and formed into a sheet while cooling on a casting roll; a water-cooled inflation method in which the molten composition is continuously extruded through a ring-shaped die, and contacted with water for cooling; an air-cooled inflation method in which the molten composition is similarly continuously extruded through a ring-shaped die, and cooled with air; or the like.

Also, the protective sheet of the present invention may be produced in the form of a laminated sheet by first forming a single-layer sheet and then laminating the obtained single-layer sheet on the other sheet. Further, the obtained sheet may be further subjected to subsequent stretching steps. The stretching may be carried out by any known industrial methods. For example, the sheet obtained by the T-die method may be longitudinally stretched using rolls, and then transversely stretched using a tenter (successive biaxially stretching method). The tubular sheet obtained using the ring-shaped die may be stretched by the above successive biaxially stretching method as well as a tubular stretching method capable of simultaneously stretching the sheet in both longitudinal and transverse directions. Also, the protective sheet may be produced by such a laboratory method in which the sheet is stretched using a table stretching machine, e.g., those manufactured by T. M. Long Corp., Toyo Seiki Seisakusho Co., Ltd. or the like.

Further, the single-layer or laminated protective sheet may be corona-treated at one or both surfaces thereof in order to improve its printability and laminating property for facilitating subsequent printing and laminating steps.

The protective sheet having a larger thickness shows high tear strength and mechanical strength, but is deteriorated in workability in use of the protective sheet. In view of well-balanced properties, the thickness of the protective sheet is preferably 10 to 700 μm, more preferably 20 to 500 μm. In the case of laminated protective sheet, the thickness of polyamide resin single layer is preferably 20 to 500 μm and the thickness of laminated sheet is preferably 30 to 700 μm.

Next, the flame-retardant polyamide-based protective sheet according to the second aspect of the present invention, and the laminated sheet according to the third aspect of the present invention, are explained.

Polyamide Resin Composition

The polyamide resin composition used in the protective sheet and the laminated sheet according to the second and third aspects of the present invention, may be the same as those described in the flame-retardant polyamide-based protective sheet according to the first aspect of the present invention.

Thermoplastic Resin

As the thermoplastic resin used for the layer B, there may be usually exemplified polystyrene resins, ABS resins, acrylic resins, polyolefin resins, polyamide resins, acetal resins, polyester resins, polycarbonate resins, fluorocarbon resins or the like. Among these thermoplastic resins, polyamide resins or polyolefin resins are more preferred from the standpoints of extrusion-moldability and sheet properties.

Examples of the polyolefin resins may include olefin-based polymers such as polyethylene, polypropylene, ionomers, ethylene-propylene copolymer and ethylene-buten-1 copolymer; copolymers of olefins and unsaturated carboxylic acids such as ethylene-vinyl acetate copolymer (EVA), ethylene-acrylic acid copolymer and ethylene-ethyl acrylate copolymer; or the like. Also, there may be used modified polyolefin resins obtained by modifying polyolefins with α-, β-unsaturated carboxylic acids.

Specific examples of the modified polyolefin resins obtained by modifying polyolefins with α-, β-unsaturated carboxylic acids, may include graft polymers obtained by grafting α-, β-unsaturated carboxylic acids or derivatives thereof to olefinic polymers containing ethylene or propylene as main constitutional units.

Examples of the olefinic polymers as a base of the graft polymers may include olefin-based polymers such as polyethylene, polypropylene, ethylene-propylene copolymer and ethylene-buten-1 copolymer; or copolymers of olefins and unsaturated carboxylic acids such as ethylene-vinyl acetate copolymer, ethylene-acrylic acid copolymer, ethylene-ethyl acrylate copolymer and ethylene-sodium acrylate copolymer.

Examples of the α-, β-unsaturated carboxylic acids or derivatives grafted to the above olefinic polymers may include acrylic acid, methacrylic acid, ethacrylic acid, maleic acid, fumaric acid, anhydrides of these acids, esters of these acids with tetrahydrofurfuryl alcohol, etc., or the like. The amount of the α-, β-unsaturated carboxylic acids or derivatives grafted to the above olefinic polymers is preferably 0.05 to 1.5% by weight based on the weight of the olefinic polymers.

When the layer B composed of the above polyolefin resin is laminated on the layer A composed of the polyamide resin composition, the modified polyolefin resins are suitably used as the polyolefin resin from the standpoint of good adhesion between these layers. Whereas, when the layer B should be released from the layer A after lamination to use the layer A as a polyamide resin single-layer film, the unmodified polyolefin resins are preferably used for the layer B.

The polyolefin resin used in the present invention has a melt flow rate (MFR) of preferably 0.05 to 50 g/10 minutes, more preferably 0.1 to 20 g/10 minutes as measured at 190° C. under a load of 2.16 kg according to JIS K-7210. When the MFR is more than 50 g/10 minutes, the polyolefin resin has a low melt viscosity, resulting in deteriorated moldability. When the MFR is less than 0.05 g/10 minutes, the polyolefin resin tends to be deteriorated in melt fluidity.

The polyamide resin composition or the thermoplastic resin used for the layer B may be blended and kneaded with pigments, dyes, fillers, nucleating agents, mold release agents, stabilizers, antistatic agents or other known additives unless the addition thereof adversely affects the effects of the present invention, upon the production of the laminated sheet. In addition, the polyamide resin composition may be further blended with other thermoplastic resins unless the addition thereof adversely affects the effects of the present invention.

Protective Sheet According to the Second Aspect of the Present Invention and Laminated Sheet According to the Third Aspect of the Present Invention The laminated sheet of the present invention comprises, for example, a layer composed of the polyamide resin composition containing the triazine-based flame retardant, and a layer composed of the polyamide resin composition containing no triazine-based flame retardant which is laminated on one or both surfaces of the former layer. The layer composed of the polyamide resin composition containing no triazine-based flame retardant which is laminated on one or both surfaces of the layer containing the triazine-based flame retardant, serves for preventing the triazine-based flame retardant from adhering to the rolled sheet.

As the laminated sheet, there may be exemplified a two-layer laminated sheet comprising a layer composed of the polyamide resin composition containing the triazine-based flame retardant, and a modified polyolefin resin layer; a three-layer laminated sheet comprising a layer composed of the polyamide resin composition containing the triazine-based flame retardant, a modified polyolefin resin layer and an EVA layer; a five-layer laminated sheet comprising an EVA layer, a modified polyolefin resin layer, a layer composed of the polyamide resin composition containing the triazine-based flame retardant, a modified polyolefin resin layer and an EVA layer; or the like.

The laminated sheet of the present invention preferably has a thickness of 10 to 700 μm, more preferably 20 to 500 μm. When the thickness is less than 10 μm, the obtained laminated sheet is deteriorated in mechanical strength. When the thickness is more than 700 μm, it is difficult to wound the obtained laminated sheet into a roll, resulting in low industrial productivity.

The laminated sheet of the present invention is required to satisfy such a condition that the ratio of the thickness of the layer B to the thickness of the layer A is less than 0.8, preferably less than 0.3.

When the ratio of the thickness of the layer B to the thickness of the layer A is not less than 0.8, the laminated sheet becomes readily flammable. The thickness of the layer B may be suitably as small as possible. However, in the actual production, the thickness of the layer B is required to be not less than 2 μm.

When the layer B is released from the laminated sheet produced to use only the layer A (hereinafter referred to merely as a "single-layer sheet"), the released layer B is usually disposed as wastes. Therefore, from the standpoints of environmental protection and cost saving, the thickness of the layer B released is required to be small similarly to the above-described thickness conditions of the laminated sheet.

The resin used for the layer B may be selected from suitable thermoplastic resins. These thermoplastic resins may be used alone or in the form of a blended mixture of any two or more thereof. In addition, the layer B may be constituted by a plurality of layers which may be composed of identical or different resins according to aimed applications. In such a case, the thickness of the layer B means a total thickness of the plural layers.

The flame-retardant laminated sheet of the present invention may be produced by any known multi-layer molding methods used for the production of conventional multi-layer sheets. More specifically, the laminated sheet may be produced by a multi-layer T-die method wherein the polyamide resin composition for the layer A and the thermoplastic resin for the layer B are respectively melted in separate extruders, and then introduced into a T-die in which these molten resins are continuously contacted with each other (in-die adhesion method) or from which these molten resins are separately extruded and then contacted with each other outside of the die (out-of-die adhesion method), and then the thus adhered resin layers are formed into a sheet while cooling on a casting roll; a multi-layer water-cooling inflation method wherein the respective resins are continuously extruded through a ring-shaped die, and contacted with water for cooling; a multi-layer air-cooling inflation method wherein the respective resins are continuously extruded through a ring-shaped die, and cooled with air; or the like. According to the applications, the laminated sheet may be further subjected to subsequent stretching steps, if required, in order to produce a stretched multi-layer sheet. As such stretching methods, there may be suitably used any known industrial stretching methods. For example, the laminated sheet obtained by the multi-layer T-die method may be stretched by a successive biaxially stretching method in which the sheet is first longitudinally stretched by rolls, and then transversely stretched by a tenter. The tubular sheet obtained using the ring-shaped die may be stretched by the above successive biaxially stretching method as well as a tubular stretching method capable of stretching the sheet in both longitudinal and transverse directions simultaneously. Further, the stretched multi-layer laminated sheet may also be produced by such a laboratory method using, for example, a table stretching machine manufactured by T. M. Long Corp., Toyo Seiki Seisakusho Co., Ltd., or the like.

The single-layer sheet of the present invention is obtained by releasing and removing the layer B from the laminated sheet produced by the above methods. The release of the layer B may be conducted either before or after stretching.

The laminated sheet or single-layer sheet of the present invention may be laminated on the other sheets, if required. Further, the laminated sheet or single-layer sheet thus laminated may be further corona-treated at one or both surfaces thereof in order to improve the printability and laminating property for subsequent uses.

In the present invention, the lamination of sheets is preferably conducted as follows. In the multi-layer T-die method, a thermoplastic resin layer may be further laminated on a surface of the sheet which is brought into contact with a back side thereof when the sheet is wound into a roll, in order to prevent the roll from being soiled with the triazine-based flame retardant precipitated on the surface. Also, in the water- or air-cooling inflation method, a thermoplastic outer layer may be laminated on the sheet in order to prevent the triazine-based flame retardant from being precipitated in the cooling water, or prevent guide plates or take-off devices contacted with the sheet from being soiled with the precipitated triazine-based flame retardant. In addition, when the polyamide resin composition containing the triazine-based flame retardant is extruded through a die, small resinous pieces tend to be stuck onto the die. Therefore, the layer composed of the polyamide resin composition is preferably laminated and covered at opposite surfaces thereof with thermoplastic resin layers in order to prevent the small resinous pieces from being stuck to the die.

In the flame-retardant laminated sheet of the present invention, any suitable combination of different resins may be used to enhance properties thereof. For example, a layer composed of polyolefins such as EVA may be laminated on one or both surfaces of the base layer. The thus prepared laminated sheet is free from shoe slippage when used as a protective sheet for covering the floor. Further, when an adhesive layer is laminated on the laminated sheet or single-layer sheet of the present invention, it is possible to impart an adhesion property thereto.

The thickness of the protective sheet according to the second aspect of the present invention is 10 to 700 μm, preferably 20 to 500 μm. The applications of the protective sheet may be the same as those described in the flame-retardant polyamide-based protective sheet according to the first aspect of the present invention.

The laminated sheet constituting the protective sheet according to the third aspect of the present invention is novel, and may be used, for example, as a fire-resistant tape. When the laminated sheet is used as the fire-resistant tape, it is required to laminate an adhesive layer on the laminated sheet in order to impart an adhesion property thereto. In this case, when the adhesive layer with a thin thickness is laminated similarly to the lamination of the thermoplastic resin layer described above, it is possible to use the adhesive layer-coated laminated sheet as a fire-resistant tape without deteriorating its flame retardancy. Also, when the laminated sheet is used as a fire-resistant tape, it is also required to readily tear the sheet in a predetermined direction. Since the laminated sheet of the present invention can be stretched up to a stretch ratio of two or more times in each of longitudinal and transverse directions, it is possible to obtain the sheet which is readily tearable only in a specific direction. Therefore, the laminated sheet of the present invention is very suitable as a fire-resistant tape.

When the laminated sheet of the present invention is used as a fire-resistant tape, those having a larger thickness show a higher mechanical strength, but are deteriorated in workability upon adhesion or become difficult to tear. In the consideration of well-balanced properties, the thickness of the laminated sheet used as a fire-resistant tape is 10 to 400 μm. In addition, the thickness of the adhesive layer is required to be not more than 40% of the thickness of the laminated sheet.

Next, the flame-retardant polyamide-based protective sheet according to the fourth aspect of the present invention and the polyamide resin composition according to the fifth aspect of the present invention are explained.

Polyamide Resin

As the polyamide resins, there may be used the same polyamide resins as described in the flame-retardant polyamide-based protective sheet according to the first aspect of the present invention.

As the triazine-based flame retardants, there may be used the same triazine-based flame retardants as described in the flame-retardant polyamide-based protective sheet according to the first aspect of the present invention.

Ester Compound

The ester compounds used in the present invention are those obtained by esterifying p-hydroxybenzoic acid and/or o-hydroxybenzoic acid with a branched aliphatic alcohol having 12 to 22 carbon atoms. When the number of carbon atoms contained in the aliphatic alcohol is less than 12, the obtained ester compound may be deteriorated in heat resistance and, therefore, tends to be scattered around upon melt-processing, thereby failing to obtain the aimed composition. When the number of carbon atoms contained in the aliphatic alcohol is more than 22, the obtained ester compound may be deteriorated in compatibility with polyamide, resulting in low flexibility of the obtained composition. Also, when an unbranched aliphatic alcohol is used for the esterification, the obtained ester compound is also deteriorated in compatibility with polyamide, resulting in low flexibility of the obtained composition.

The amount of the ester compound blended is 0.1 to 20 parts by weight. When the amount of the ester compound blended is less than 0.1 part by weight, the obtained composition may not be sufficiently improved in flexibility. When the amount of the ester compound blended is more than 20 parts by weight, the obtained composition may be deteriorated in moldability and flame retardancy. In the consideration of well-balanced moldability and flame retardancy, the amount of the ester compound blended is preferably 0.3 to 15 parts by weight.

Hindered Phenol-based Compound, Phosphorus-based Stabilizer and/or Sulfur-based Stabilizer The hindered phenol-based compounds used in the present invention are those compounds having a 2,6-or 2,4-alkyl-substituted phenol structure in a molecule thereof which are generally used as antioxidants or processing stabilizers. The hydroxy group of the phenol may be esterified with phosphorous acid or the like. In addition, the alkyl-substituted phenol structure may be present at one or more positions of the molecule.

Specific examples of the hindered phenol-based compounds may include triethylene glycol-bis[3-(3-t-butyl-5-methyl-4-hydroxyphenyl)propionate], 1,6-hexanediol-bis[3-(3,5-di-t-butyl-4-hydroxyphenyl)propionate], pentaerythrityl-tetrakis[3-(3,5-di-t-butyl-4-hydroxyphenyl) propionate], N,N'-hexamethylenebis(3,5-di-t-butyl-4-hydroxyamide), 3,5-di-t-butyl-4-hydroxybenzylphosphonate-diethyl ester, octadecyl-3-(3,5-di-t-butyl-4-hydroxyphenyl)propionate, 1,3,5-trimethyl-2,4,6-tris-(3,5-di-t-butyl-4-hydroxybenzyl)benzene, 2,4-bis-(n-octylthio)-6-(4-hydroxy-3,5-di-t-butylanilino)-1,3,5-triazine, 2,2-thio-diethylenebis[3-(3,5-di-t-butyl-4-hydroxyphenyl)propionate] or the like. These hindered phenol-based compounds may be used alone or in combination of any two or more thereof.

Examples of the phosphorus-based stabilizers used in the present invention may include bis(2,6-di-t-butyl-4-methylphenyl)pentaerythritol-di-phosphite, bis(2,4-di-t-butylphenyl)pentaerythritol-di-phosphite, tris(2,4-di-t-butylphenyl)phosphite, tetrakis(2,4-di-t-butylphenyl)-4,4'-biphenylenediphosphonite or the like. These phosphorus-based stabilizers may be used alone or in combination of any two or more thereof.

Examples of the sulfur-based stabilizers may include tetrakis[methylene-3-(dodecylthio)propionate]methane, bis[2-methyl-4-{3-n-alkyl($C_{12}$ or $C_{14}$)thiopropionyloxy}-5-t-butylphenyl]sulfide, di-tridecyl-thio-di-propionate, di-stearyl-thio-di-propionate, di-lauryl-thio-di-propionate or the like. These sulfur-based stabilizers may be used alone or in combination of any two or more thereof. In addition, in the polyamide resin composition of the present invention, there may be used at least one compound selected from the group consisting of the above hindered phenol-based compounds, phosphorus-based stabilizers and sulfur-based stabilizers.

Polyamide Resin Composition

The polyamide resin composition of the present invention may contain the above hindered phenol-based compound, phosphorus-based stabilizer and/or sulfur-based stabilizer in an amount of 0.01 to 5 parts by weight, preferably 0.05 to 3 parts by weight based on 100 parts by weight of the whole composition. When the content of the hindered phenol-based compound, phosphorus-based stabilizer and/or sulfur-based stabilizer is less than 0.01 part by weight, the obtained composition may not be sufficiently improved in heat-aging property. When the content of the hindered phenol-based compound, phosphorus-based stabilizer and/or sulfur-based stabilizer is more than 5 parts by weight, the effects obtained by the addition of these compounds are already saturated, and rather the obtained molded product tends to suffer from poor surface conditions such as blooming. In order to use an extrusion-molded product produced from the polyamide resin composition of the present invention as those products having a high flexibility and a high flame retardancy, the molded product preferably shows a low tensile elasticity as well as such a flame retardant level that the oxygen index thereof in absolute dry condition is not less than 23. In addition, the polyamide resin preferably has a relative viscosity of 2.8 to 5.5. Upon the extrusion-molding, care should be taken such that the resin temperature is not more than 300° C., preferably not more than 280° C., more preferably not more than 260° C. in order to prevent the decomposition of the flame retardant or the ester compound.

The polyamide resin composition of the present invention may be blended and kneaded with pigments, dyes, fillers, nucleating agents, mold release agents, stabilizers, antistatic agents or other known additives unless the addition thereof adversely affects the effects of the present invention, upon the production of the extrusion-molded product. Further, the polyamide resin composition may be blended with thermoplastic resins other than polyamide resins, unless the addition thereof adversely affects the effects of the present invention.

Further, in the production of the polyamide resin composition of the present invention, the polyamide resin, the flame retardant, the ester compound and various additives may be mixed together and then pelletized using various extruders. Then, the thus prepared pellets may be dry-blended with pellets made of other thermoplastic resins.

Protective Sheet According to the Fourth Aspect of the Present Invention

The protective sheet according to the fourth aspect of the present invention is substantially identical to the flame-retardant polyamide-based protective sheet according to the first aspect of the present invention, except that the compositions used therein are different from each other.

The polyamide resin composition of the present invention is novel by itself, and may be formed into a laminated sheet. Upon the production of the laminated sheet from the polyamide resin composition of the present invention, there may be used conventional multi-layer sheet molding methods. Specific examples of the multi-layer sheet molding methods may include a multi-layer T-die method in which after resins are continuously extruded while contacting with each other within a T-die (in-die adhesion method) or resins are separately extruded through a T-die and then contacted with each other outside of the T-die (out-of-die adhesion method), the extruded resin layers are formed into a sheet while cooling on a casting roll; a multi-layer water-cooling inflation method in which resins are continuously extruded through a ring-shaped die and then contacted with water for cooling; a multi-layer air-cooling method in which resins are continuously extruded through a ring-shaped die and then cooled with air; or the like.

The resins used for the layer laminated on the base layer may be the same polyamide resins as used for the base layer, or may be different thermoplastic resins. The thermoplastic resins used for the layer laminated on the base layer are preferably polyamide resins, polyester resins or polyolefin resins from the standpoint of good moldability.

The polyamide resin composition of the present invention may be extruded through dies having various shapes to produce various profile extrusion-molded products such as tubes or boxes. Further, after being drawn into a tube, the tubular product may be compressed in a metal mold to produce bellows-shaped tubes such as corrugated tubes, or may be spirally cut to produce spiral tubes. The polyamide resin used for the production of boxes preferably has a relatively high relative viscosity ranging from 3.2 to 5.5; whereas the polyamide resin used for the production of tubes preferably has a relatively low relative viscosity ranging from 2.8 to 4.5.

Next, the extrusion-molded flame-retardant polyamide-based protective sheet according to the sixth aspect of the present invention and the extrusion-molded laminated sheet according to the seventh aspect of the present invention are explained.

Polyamide Resin Composition

As the polyamide resin composition constituting the layer A, there may be used the same polyamide resin composition as used in the above fifth aspect of the present invention.

As the thermoplastic resin constituting the layer B, there may be used the same thermoplastic resins as used for the flame-retardant polyamide-based protective sheet according to the second aspect of the present invention and the laminated sheet according to the third aspect of the present invention.

Flame-retardant Polyamide-based Protective Sheet According to the Sixth Aspect of the Present Invention The protective sheet according to the seventh aspect of the present invention is substantially identical to the flame-retardant polyamide-based protective sheet according to the second aspect of the present invention, except that the compositions used therein are different from each other.

Also, the laminated sheet itself constituting the protective sheet of the present invention is novel.

Next, the extrusion-molded product according to the eighth aspect of the present invention and the tube according to the ninth aspect of the present invention are explained.

The extrusion-molded product and the tube of the present invention are produced from the novel polyamide resin composition described in the fifth aspect of the present invention. The extrusion-molded product and the tube preferably exhibit such a flame retardancy that the oxygen index thereof is not less than 23. Materials having an oxygen index of not less than 22 are self-extinguishing materials incapable of continuously burning in atmospheric air. Although the oxygen index of the polyamide resin may vary depending upon water content thereof, the oxygen index of the extrusion-molded product and the tube in absolute dry condition are preferably not less than 23, more preferably not less than 26 in view of environmental conditions upon practical use thereof.

The heat-aging resistance of the tube is not particularly required in some industrial applications. However, when used in the applications requiring a good heat-aging resistance, the tube preferably exhibits a tensile elongation of not less than 100% as measured after subjecting the tube to a heat treatment at 150° C. for 120 hours for evaluation of the heat-aging resistance. The tube capable of satisfying the above requirement is suitable as heat-resistant tube for automobiles. When the tensile elongation is less than 100%, the obtained tube tends to suffer from cracks or rupture. Also, the polyamide resin composition of the present invention preferably has a melting point of not less than 190° C. When the melting point is less than 190° C., the polyamide resin composition is partially fused upon the above 150° C. heat-treatment. In actual use, the tube tends to suffer from cracks due to heat transfer or deteriorated surface conditions due to surface fusion at portions where the tube is clamped by connecting bands or metallic fitting jigs.

The thickness of the tube made of the polyamide resin composition of the present invention is preferably 0.1 to 2 mm. When the thickness is less than 0.1 mm, it is difficult to retain the tubular shape of the molded product. When the thickness is more than 2 mm, the obtained tubular molded product becomes hard and fails to show a good flexibility, resulting in poor assembling of the tubular molded product.

As described above, the protective sheet made of such a specific polyamide resin composition is excellent in flame retardancy, flexibility, incineration property, environmental suitability, tear property, mechanical strength and workability. Also, since the protective sheet contains a halogen-free flame retardant, it is possible to enhance safety and considerably reduce operator's burdens when used in electric power plants. Further, the protective sheet of the present invention is free from the generation of dioxin upon incineration thereof and, therefore, is environment-friendly.

In addition, the protective sheet of the present invention is excellent in general sheet properties and, therefore, can also be suitably used as industrial materials or various packaging materials.

Also, the laminated sheet or single-layer sheet made of the specific polyamide resin composition according to the present invention can be used as a semiconductor-wrapping or packaging sheet in electric and electronic fields or ceiling materials in automobile fields because of excellent flame retardancy, environmental suitability and mechanical strength thereof. In addition, the laminated sheet or single-layer sheet can also be used as a general protective sheet as well as a protective sheet with a high flame retardancy in fireproofing applications or in atomic power plants because of excellent incineration property and tear property thereof.

Further, the laminated sheet or single-layer sheet having an adhesive layer thereon can be used as a fire-resistant tape.

Besides, the polyamide resin composition of the present invention is excellent in not only flame retardancy, flexibility, incineration property, environmental suitability, mechanical strength, heat resistance and moldability, but also heat-aging resistance. Therefore, it is possible to obtain extensively applicable and industrially valuable molded products, e.g., sheets, films, profile extrusion-molded products or general extrusion-molded products such as tubes, from the polyamide resin composition.

Further, the extrusion-molded product and the tube made of the polyamide resin composition of the present invention are extensively applicable to not only general tubes or industrial tubes, but also various heat-resistant tubes such as corrugated tubes or spiral tubes which are required to withstand continuous use under a high temperature within the engine room of automobiles.

EXAMPLES

The present invention will be described in more detail by reference to the following examples. However, these examples are only illustrative and not intended to limit the present invention thereto.

Various characteristics were determined or evaluated by the following methods.

(1) Specific Gravity

The specific gravity was measured according to ASTM D-792.

(2) Amount of Residual Ashes 10 g of a polyamide resin composition was burned in an electric furnace at 700° C. for 5 hours, and then the amount of residual ashes were measured and expressed by % by weight.

(3) Oxygen Index

The oxygen index was measured according to JIS K-7201.

(4) VTM Test

The VTM test was conducted according to UL94 VTM method to determine whether or not a specimen was acceptable for VTM-0 rating.

(5) Tear Property

The tear strength was measured at 23° C. and a relative humidity (RH) of 50% or 65% by Trauzer method described in JIS K-7128, and expressed by N/mm.

(6) Tensile Break Strength

The tensile break strength was measured at 23° C. and a relative humidity (RH) of 50% or 65% according to JIS K-7127, and expressed by MPa.

(7) Tensile Break Elongation

The tensile break elongation was measured at 23° C. and a relative humidity (RH) of 50% or 65% according to JIS K-7127, and expressed by %.

(8) Thickness

The section of the laminated film was observed by an optical microscope to measure the thickness of respective layers.

(9) Precipitation of Flame Retardant

The air-cooling inflation process was continuously conducted for 3 hours. Then, an air-cooling guide plate was visually observed to determine whether or not the flame retardant was adhered thereonto.

(10) Melting Point

The melting peak temperature was measured by heating 10 mmg of a specimen at a temperature rise rate of 10° C./minute using "DSC 20" manufactured by Seiko Denshi Kogyo Co., Ltd.

(11) Relative Viscosity

The relative viscosity was measured at 25° C. at a concentration of 1% in 98% sulfuric acid according to JIS K-6810.

(12) Tensile Elongation After Heat-aging

Preparation of Tensile Test Specimen

A 100 mm-square sheet having a thickness of 1 mm was prepared using an injection-molding machine "IS80EPN" manufactured by Toshiba Kikai Kogyo Co., Ltd., under the following conditions:

Cylinder temperature: 250° C.;

Mold temperature: 80° C.;

Injection time: 10 seconds; and

Cooling time: 15 seconds.

Heat-aging Treatment

The thus prepared 100 mm-square sheet having a thickness of 1 mm was cut by a JIS #3 rubber dumbbell punching die in the machine direction to form a test specimen. The obtained test specimen was placed in a hot air circulation-type oven, and heat-aged therein at 150° C. for 120 hours.

Tensile Elongation

The heat-aged test specimen was then allowed to stand at 23° C. and a relative humidity (RH) of 50% for 48 hours or longer. The tensile elongation of the test specimen was measured according to ASTM-D638.

In the following Examples, Comparative Examples and Reference Examples, the below-mentioned raw materials were used.

Polyamide resin A: nylon 6 produced by Mitsubishi Engineering-Plastics Corporation; grade name: 1020J; relative viscosity: 3.5; melting point: 224° C., Polyamide resin B: nylon 6/66 produced by Mitsubishi Engineering-Plastics Corporation; grade name: 2020J; relative viscosity: 3.5; melting point: 198° C., Triazine-based flame retardant: melamine cyanurate "MCA-COP" produced by Mitsubishi Chemical Corporation, Phosphorus-based flame retardant: red phosphorus (grade name: "HISHI-GUARD TP10"; having a surface coating) produced by Nippon Kayaku Co., Ltd., Polyolefin resin: low-density polyethylene produced by Japan Polychem Corporation; MFR: 2.2, Modified polyolefin resin: modified polypropylene produced by Mitsubishi Chemical Corporation; MFR: 2.3, Ester compound A: p-hydroxybenzoic acid and 2-hexyldecanol (having 16 carbon atoms) were heat-dehydrated at a temperature of 200 to 260° C. to obtain a 2-hexyldecanol ester of p-hydroxybenzoic acid.

Ester compound B: p-hydroxybenzoic acid and 2-ethyldecanol (having 8 carbon atoms) were heat-dehydrated at a temperature of 200 to 260° C. to obtain a 2-ethyldecanol ester of p-hydroxybenzoic acid.

Hindered phenol-based compound: N,N'-hexamethylenebis(3,5-di-t-butyl-4-hydroxyphenyl) propionate "IRGANOX 1098" produced by Ciba Specialty Chemicals Corp., Phosphorus-based stabilizer: bis(2,6-di-t-butyl-4-methylphenyl)pentaerythritol-di-phosphite "PEP-36" produced by Asahi Denka Kogyo Co., Ltd., Sulfur-based stabilizer: di-lauryl-thio-di-propionate "DLTP" produced by Yoshitomi Seiyaku Co., Ltd., Polyolefin resin: acid-modified polyolefin resin "MODIC-AP730T" produced by Mitsubishi Chemical Corporation.

Examples 1 to 3 and Comparative Examples 1 to 2

Polyamide resin and flame retardant as shown in Table 1 were blended together at a mixing ratio shown in Table 1, and then melt-kneaded and pelletized using "TEX-30HCT" manufactured by Nippon Seikosho Co., Ltd., at a cylinder set temperature of 250° C. The thus pelletized material was dried using a vacuum dryer at 120° C., thereby obtaining pellets made of the polyamide resin composition. The pellets were tested to measure a specific gravity and amount of residual ashes thereof. In addition, the pellets were melt-extruded using a single-layer T-die molding machine manufactured by Ikegai Tekko Co., Ltd., at a cylinder set temperature of 250° C. and a screw speed of 50 rpm. While cooling at 30° C. on a casting roll, the extruded material was drawn at a take-off speed of 1.5 to 2.0 m/minute, thereby obtaining a protective sheet having a thickness of 120 μm. The thus obtained protective sheet was tested to measure or evaluate an oxygen index, "VTM-0" acceptance or non-acceptance, tear strength, tensile break strength and tensile break elongation thereof. The results are shown in Table 1.

TABLE 1

| Items | Unit | Ex. 1 | Ex. 2 | Ex. 3 | Comp. Ex. 1 | Comp. Ex. 2 |
|---|---|---|---|---|---|---|
| Polyamide A | wt % | 90 | — | 96 | 99 | 50 |
| Polyamide B | wt % | — | 90 | — | — | — |
| Triazine-based flame retardant | wt % | 10 | 10 | 3 | 1 | 50 |
| Phosphorus-based flame retardant | wt % | — | — | 1 | — | — |
| Specific gravity | — | 1.17 | 1.17 | 1.17 | 1.14 | 1.27 |
| Amount of residual ashes | wt % | <0.1 | <0.1 | 1 | <0.1 | <0.1 |
| Oxygen index | — | 35 | 35 | 35 | 25 | 45 |
| VTM-0* | — | A | A | A | B | A |
| Tear strength | N/mm | 70 | 70 | 70 | 80 | <20 |
| Tensile break strength (at 23° C. under 65% RH) | MPa | 70 | 60 | 70 | 70 | 20 |
| Tensile break elongation (at 23° C. under 65% RH) | % | 500 | 600 | 500 | 600 | 50 |

Note*:
A: Acceptance;
B: Non-acceptance

Examples 4 to 8, Comparative Example 3 and Reference Examples 1 and 2

Polyamide resin and triazine-based flame retardant as shown in Tables 2 and 3 were blended together at a mixing ratio shown in Tables 2 and 3, and then melt-kneaded and pelletized using "TEX-30HCT" manufactured by Nippon Seikosho Co., Ltd., at a cylinder set temperature of 250° C. The thus pelletized material was dried using a vacuum dryer at 120° C., thereby obtaining pellets made of the polyamide resin composition.

Using a three-layer air-cooling inflation molding machine manufactured by Placo Co., Ltd., the resin or resin composition for the layer B as shown in Tables 2 and 3 was extruded through an outer die portion thereof, and the same polyamide resin composition for the layer A as shown in Tables 2 and 3 was extruded through intermediate and inner die portions thereof, thereby preparing a two-layer laminated film. Specifically, the respective resins or resin compositions as shown in Tables 2 and 3 were melted at a cylinder set temperature of 250° C., inflation-molded at a blow ratio of 1.5, cooled at an air-cooling temperature of 23° C. and an air speed of 8 to 10 m, and then drawn at a take-off speed of 4 to 6 m, thereby obtaining a laminated film composed of respective layers each having a thickness shown in Tables 2 and 3. The thus obtained laminated film was tested to measure or evaluate an amount of residual ashes, oxygen index, "VTM-0" acceptance or non-acceptance, tear strength, tensile break strength and tensile break elongation thereof.

Meanwhile, in Example 6, after producing the flame-retardant laminated film, the layer B made of polyolefin was released therefrom to obtain a flame-retardant single-layer film. The thus obtained single-layer film was tested to measure various properties thereof.

In Example 8, the same procedure as defined above was conducted except that the same polyamide resin was extruded through the outer and inner die portions to form outer and inner layers B each having a thickness of 5 μm, and the intermediate layer A was extruded therebetween, thereby obtaining a three-layer laminated film A/B/A. The thus obtained laminated film was tested to measure various properties thereof. The results are shown in Tables 2 and 3.

TABLE 2

| Items | Unit | Ex. 4 | Ex. 5 | Ex. 6 | Ex. 7 | Ex. 8 |
|---|---|---|---|---|---|---|
| Layer B: | | | | | | |
| Polyamide A | wt % | 100 | 100 | — | — | 100 |
| Polyolefin | wt % | — | — | 100 | — | — |
| Modified polyolefin | wt % | — | — | — | 100 | — |
| Triazine-based flame retardant | wt % | — | — | — | — | — |
| Layer A: | | | | | | |
| Polyamide A | wt % | 90 | — | 90 | 90 | 90 |
| Polyamide B | wt % | — | 90 | — | — | — |
| Triazine-based flame retardant | wt % | 10 | 10 | 10 | 10 | 10 |
| Thickness of layer B | μm | 10 | 10 | 10 | 10 | 5 + 5 |
| Thickness of layer A | μm | 90 | 90 | 90 | 90 | 90 |
| Thickness ratio B/A | — | 0.11 | 0.11 | 0.11 | 0.11 | 0.11 |
| Presence of layer B upon measurement | — | Yes | Yes | None | Yes | Yes |
| Precipitation of flame retardant | — | None | None | None | None | None |
| Amount of residual ashes | wt % | <1 | <1 | <1 | <1 | <1 |
| Oxygen index | — | 30 | 30 | 35 | 27 | 30 |
| VTM-0* | — | A | A | A | A | A |
| Tear strength | N/mm | 70 | 70 | 70 | 80 | 70 |
| Tensile break strength (at 23° C. under 65% RH) | MPa | 70 | 60 | 70 | 80 | 70 |
| Tensile break elongation (at 23° C. under 65% RH) | % | 500 | 600 | 500 | 550 | 500 |

Note*:
A: Acceptance;
B: Non-acceptance

TABLE 3

| Items | Unit | Ref. Ex. 4 | Ref. Ex. 4 | Com. Ex. 4 |
|---|---|---|---|---|
| Layer B: | | | | |
| Polyamide A | wt % | 90 | 100 | 100 |
| Polyolefin | wt % | — | — | — |
| Triazine-based flame retardant | wt % | 10 | — | — |
| Layer A: | | | | |
| Polyamide A | wt % | 90 | 90 | 50 |
| Polyamide B | wt % | — | — | — |
| Triazine-based flame retardant | wt % | 10 | 10 | 50 |
| Thickness of layer B | μm | 10 | 50 | 10 |
| Thickness of layer A | μm | 90 | 50 | 90 |
| Thickness ratio B/A | — | 0.11 | 1 | 0.11 |
| Presence of layer B upon measurement | — | Yes | Yes | Yes |
| Precipitation of flame retardant | — | Yes | None | None |
| Amount of residual ashes | wt % | <1 | <1 | 2.5 |
| Oxygen index | — | 35 | 24 | 45 |
| VTM-0* | — | A | B | A |
| Tear strength | N/mm | 70 | 70 | 40 |
| Tensile break strength (at 23° C. under 65% RH) | MPa | 70 | 80 | 30 |
| Tensile break elongation (at 23° C. under 65% RH) | % | 500 | 600 | 100 |

Note*:
A: Acceptance;
B: Non-acceptance

TABLE 4

| Items | Unit | Ex. 9 | Ex. 10 | Ref. Ex. 3 | Ref. Ex. 4 | Ref. Ex. 5 |
|---|---|---|---|---|---|---|
| Polyamide A | wt. part | 85 | — | 90 | — | 87 |
| Polyamide B | wt. part | — | 85 | — | 90 | — |
| Triazine-based flame retardant | wt. part | 10 | 10 | 10 | 10 | 10 |
| Ester compound A | wt. part | 5 | 5 | — | — | — |
| Polyolefin resin | wt. part | — | — | — | — | 3 |
| Specific gravity | — | 1.16 | 1.16 | 1.17 | 1.17 | 1.14 |
| Amount of residual ashes | wt. % | <0.1 | <0.1 | <0.1 | <0.1 | <0.1 |
| Oxygen index | — | 32 | 32 | 35 | 35 | 21 |
| VTM-0* | — | A | A | A | A | B |
| Tear strength | N/mm | 70 | 70 | 70 | 70 | 70 |
| Tensile break strength | MPa | 70 | 60 | 70 | 60 | 70 |
| Tensile modulus (at 23° C. under 50% RH) | MPa | 350 | 250 | 700 | 500 | 350 |
| Tensile break elongation (at 23° C. under 50% RH) | % | 400 | 500 | 300 | 400 | 400 |

Note*:
A: Acceptance;
B: Non-acceptance

Examples 9 to 10 and Reference Examples 3 to 5 ; Protective Sheet

Polyamide resin, flame retardant, ester compound and polyolefin resin as shown in Table 4 were blended together at a mixing ratio shown in Table 4, and then melt-kneaded and pelletized using "TEX-30HCT" manufactured by Nippon Seikosho Co., Ltd., at a cylinder set temperature of 250° C. The thus pelletized material was dried using a vacuum dryer at 120° C., thereby obtaining pellets made of the polyamide resin composition. The obtained pellets were tested to measure the specific gravity and the amount of residual ashes thereof. In addition, the pellets were melt-extruded using a single-layer T-die molding machine manufactured by Ikegai Tekko Co., Ltd., at a cylinder set temperature of 250° C. and a screw speed of 50 rpm. While cooling on a casting roll, the extruded material was drawn at a take-off speed of 1.5 to 2.0 m/minute, thereby obtaining a protective sheet having a thickness of 120 μm. The thus obtained protective sheet was tested to measure or evaluate an oxygen index, "VTM-0" acceptance or non-acceptance, tear strength, tensile break strength and tensile break elongation thereof. The results are shown in Table 4. Meanwhile, the contents of P, F, Cl, Br, Pb and Zn in the polyamide resin composition were measured by atomic absorption method. As a result, it was confirmed that the contents of P, Cl and Br were respectively not more than 100 ppm; the contents of Pb and Zn were respectively not more than 50 ppm; and the content of Fe was not more than 10 ppm.

Examples 11 and 12 and Reference Examples 6 and 7; Tube

Polyamide resin, flame retardant, ester compound, hindered phenol-based compound, phosphorus-based stabilizer, sulfur-based stabilizer and polyolefin resin as shown in Table 5 were blended together at a mixing ratio shown in Table 5, and then melt-kneaded and pelletized using "TEX-30HCT" manufactured by Nippon Seikosho Co., Ltd. at a cylinder set temperature of 250° C. The thus pelletized material was dried using a vacuum dryer at 120° C., thereby obtaining pellets made of the polyamide resin composition.

The pellets were measured to determine a specific gravity and an amount of residual ashes thereof. In addition, the pellets were molded to form a predetermined tensile test specimen. The test specimen was heat-aged and then tested to measure a tensile elongation thereof after heat-aging. Further, the pellets were melt-extruded through a 15 mmφ circular die fitted to a tip end of a single-screw extruder having a cylinder diameter of 40 mm and a ratio L/D of 22, at a cylinder set temperature of 250° C. Then, the extruded tubular material was fed through a regulating ring having an inner diameter of 10 mm, and drawn and cooled simultaneously while guiding the tubular material along inside of the regulating ring in close contact therewith, thereby obtaining a tube having a thickness of 0.8 mm. The extrusion-molded tube was allowed to stand at 23° C. and a relative humidity (RH) of 50% for 48 hours, and then tested to measure the oxygen index and other properties thereof. The results are shown in Table 5.

TABLE 5

| Items | Unit | Ex. 11 | Ex. 12 | Ref. Ex. 3 | Ref. Ex. 4 |
|---|---|---|---|---|---|
| Polyamide A | wt. part | 85 | — | — | — |
| Polyamide B | wt. part | — | 85 | 85 | 87 |
| Triazine-based flame retardant | wt. part | 10 | 10 | 10 | 10 |
| Ester compound A | wt. part | 5 | 5 | — | — |
| Ester compound B | wt. part | — | — | 5 | — |
| Polyolefin resin | wt. part | — | — | — | 3 |
| Hindered phenol-based compound | wt. part | 0.5 | 0.5 | 0.5 | 0.5 |
| Phosphorus-based stabilizer | wt. part | 0.3 | 0.3 | 0.3 | 0.3 |
| Sulfur-based stabilizer | wt. part | 0.2 | 0.2 | 0.2 | 0.2 |
| Specific gravity | — | 1.16 | 1.16 | 1.16 | 1.14 |
| Amount of residual ashes | wt. % | <0.1 | <0.1 | <0.1 | <0.1 |
| Oxygen index | — | 32 | 32 | 25 | 21 |
| Tensile elongation after heat-aging | % | 110 | 200 | 50 | 200 |

What is claimed is:

1. A flame-retardant polyamide-based protective sheet which has a thickness of 10 to 700 μm and which comprises a polyamide resin composition comprising 98 to 70 parts by weight of a polyamide resin and 2 to 30 parts by weight of a melamine cyanurate-based flame retardant, wherein parts by weight are based on 100 parts by weight of total polyamide resin composition, and 0.01 to 5 parts by weight based on 100 parts by weight of the polyamide resin composition, of at least one selected from the group consisting of hindered phenol-based compounds, phosphorous-based stabilizers and sulfur-based stabilizers; and which has a tear strength of not less than 20 N/mm as measured by the method described in JIS K-7128; which has an oxygen index of not less than 26 as measured by the method described in JIS K-7201; and which accepts "VTM-0" when tested by UL-94 VTM method or has an oxygen index of not less than 26.

2. A flame-retardant polyamide-based protective sheet according to claim 1, the relative viscosity of the polyamide resins is in the range of 2.0 to 6.5 and the specific gravity of the polyamide resin composition is 1.10 to 1.25.

3. A method of forming a flame-retardant polyamide-based protective sheet by extrusion-molding, which method comprises using a polyamide resin composition comprising:
 98 to 70 parts by weight of a polyamide resin and
 2 to 30 parts by weight of a melamine cyanurate-based flame retardant.

4. A method according to claim 3, wherein said flame-retardant polyamide-based protective sheet has a tear strength of not less than 20 N/mm as measured by the method described in JIS K-7128; has an oxygen index of not less than 26 as measured by the method described in JIS K-7201; and accepts "VTM-0" when tested by UL-94 VTM method or has an oxygen index of not less than 26.

5. A method according to claim 3, wherein said polyamide resin composition has a specific gravity of 1.10 to 1.25.

6. A method according to claim 3, wherein an amount of residual ashes remaining after burning said polyamide resin composition at 700° C. for 5 hours is not more than 2% by weight.

7. A method according to claim 3, wherein said polyamide resin composition further comprises 0.01 to 5 parts by weight based on 100 parts by weight of the polyamide resin composition, of at least one selected from the group consisting of hindered phenol-based compounds, phosphorous-based stabilizers and sulfur-based stabilizers.

8. A method according to claim 3, wherein the flame-retardant polyamide-based protective sheet is used (1) to enclose or surround building construction sites, construction work fields or floors, (2) to enclose or surround warehouses, tents or insides thereof as well as floors, (3) to enclose or surround local working sites within electric power plants or other buildings or (4) to enclose or surround automobiles.

* * * * *